United States Patent [19]

Bonne et al.

[11] Patent Number: 5,684,253
[45] Date of Patent: Nov. 4, 1997

[54] DIFFERENTIAL PRESSURE SENSOR WITH STRESS REDUCING PRESSURE BALANCING MEANS

[75] Inventors: Ulrich Bonne, Hopkins, Minn.; D. Joseph Maurer, Pearl City, Ill.

[73] Assignee: Honeywell Inc., Minneapolis, Minn.

[21] Appl. No.: 780,751

[22] Filed: Jan. 8, 1997

[51] Int. Cl.[6] ........................................ G01L 7/00
[52] U.S. Cl. .................................................. 73/706
[58] Field of Search ........................ 73/706, 720, 721, 73/726, 727, 756; 338/42, 36, 2, 4

[56] References Cited

U.S. PATENT DOCUMENTS

| | | | |
|---|---|---|---|
| 5,184,107 | 2/1993 | Maurer | 338/42 |
| 5,257,547 | 11/1993 | Boyer | 73/721 |
| 5,327,785 | 7/1994 | Maurer | 73/756 |
| 5,351,550 | 10/1994 | Maurer | 73/727 |
| 5,410,916 | 5/1995 | Cook | 73/706 |
| 5,412,994 | 5/1995 | Cook et al. | 73/756 |

Primary Examiner—George M. Dombroske
Assistant Examiner—William L. Oen
Attorney, Agent, or Firm—William D. Lanyi; John G. Shudy, Jr.

[57] ABSTRACT

The present invention relates generally to a pressure sensor and, more specifically, to a pressure equalization structure that balances the forces on the pressure sensitive component in order to reduce the stress that could otherwise be imposed on its piezoresistors. The pressure sensor provides a housing in which a cavity is formed. Within the cavity, a pressure sensitive component is disposed between a first seal and a second seal in order to expose a first surface of the pressure sensitive component to a first conduit and a second surface of the pressure sensitive component to a second conduit. The pressure surrounding the pressure sensitive structure is generally equalized to one of the first and second conduits by providing a bypass conduit connected therebetween.

16 Claims, 7 Drawing Sheets

DIFFERENTIAL PRESSURE SENSOR WITH STRESS REDUCING PRESSURE BALANCING MEANS

BACKGROUND OF THE INVENTION

1. Field of the Invention

The present invention is generally related to pressure sensors and, more particularly, to a differential pressure sensor that provides a means for equalizing the pressure at the internal and external surfaces of a pressure sensing device which comprises a pressure sensitive component and a pair of seals.

2. Description of the Prior Art

Many different types of pressure sensors are known to those skilled in the art. Some pressure sensors, referred to by skilled artisans as differential pressure sensors, measure the pressure differential between two volumes of fluid. Other pressure sensors measure the difference between the pressure of a volume of fluid and ambient pressure. Certain types of pressure sensors utilize a silicon die as the pressure sensitive component. In typical applications, the silicon die is provided with one or more piezoresistive elements disposed on a surface of the die. The silicon die can be etched to create a depression in one surface of the die which, as a result, provides a thin diaphragm membrane at the opposite surface of the die which is highly sensitive to changes in pressure between the two sides of the membrane. Other versions of silicon die pressure sensors do not etch the silicon but, instead, use the entire slab of silicon as the deformable member.

U.S. Pat. No. 5,184,107, which issued to Maurer on Feb. 2, 1993, discloses a piezoresistive pressure transducer with a conductive elastomeric seal. This low cost piezoresistive pressure transducer utilizes premolded elastomeric seals in which at least one seal is electrically conductive. A piezoresistive stress sensitive element in the form of a diaphragm of semiconductor material having a thickened rim is held at its rim between a pair of premolded elastomeric seals in a two piece housing. Electrical connections with external circuitry are made by conductive paths through one of the elastomeric seals which makes contact with electrical leads which pass through the housing wall.

U.S. Pat. No. 5,327,785, which issued to Maurer on Jul. 12, 1994, describes a pressure sensor with improved heat dissipation characteristics. The pressure sensor is provided with a means for efficiently removing heat from a circuit portion of a sensor die by providing an elastomeric member between a first surface of the sensor die and electrical leads. A thermally conductive, but electrically insulative, portion of the elastomeric member is disposed between the circuit portion of the sensor die and the leads and a means is provided for urging the first surface of the sensor die into thermal communicating contact with the thermally conductive portion of the elastomeric member. In addition, a selectively conductive portion of the elastomeric member is disposed between contact pads on the first surface of the sensor die and electrical leads encapsulated within a portion of the sensor housing. The elastomeric member is also provided with an opening formed therethrough and aligned with the diaphragm portion of the sensor die to permit the media to be in fluid communication with the diaphragm of the sensor die. The improved sensor die arrangement provided by the device can be adapted for use in either an absolute pressure sensing embodiment or a differential pressure sensing embodiment.

U.S. Pat. No. 5,257,547, which issued to Boyer on Nov. 2, 1993, discloses an amplified pressure transducer. The pressure transducer is provided with numerous stress reducing characteristics. A pressure sensor is mounted to a ceramic plate with a buffer plate therebetween to isolate the pressure sensor from stresses that could be transmitted through the ceramic plate. The ceramic plate is necessary for the purpose of supporting a plurality of electronic components which comprise an amplification and compensation circuit. The ceramic plate is separated from all parts of its housing except an minimal central surface on a support boss which provides the support for the pressure sensitive device.

U.S. Pat. No. 5,412,994, which issued to Cook et al on May 9, 1995, discloses an offset pressure sensor. The pressure sensor is provided with pressure sensing components that are isolated from a portion of an attached buffer member which is connected to a fluid conduit. The offset characteristic of the pressure sensor isolates stress from being transmitted between an attached external fluid conduit and the sensitive components of the pressure sensor. One embodiment of the pressure sensor solders a fluid conduit structure to a buffer member that is attached to a pressure sensor die. An alternative embodiment of the sensor avoids the need for making solder connections between the sensor structure and external components by utilizing elastomeric conductors and pressure seals in association with the pressure sensor composite structure and first and second housing structures. These elastomeric conductors also provide improved stress isolation. The housing structures are used to compress the seal and the elastomeric conductors against selected portions of the composite sensor.

U.S. Pat. No. 5,410,916, which issued to Cook on May 2, 1995, discloses a flow through pressure sensor. The sensor avoids the creation of crevices and creases that could provide difficulty in cleansing certain regions of the device. The sensor is particularly adapted for use in applications that require cleansing to avoid the buildup of bacterial-laden material. The flowthrough pressure sensor is particularly adapted for use in the measurement of bodily fluids. A first conduit is connected in fluid communication with the second conduit which, in turn, is associated with a pressure sensitive element and two compressible seals. A housing member is provided with an opening into which the compressible seals in the pressure sensitive element are disposed. A latching mechanism is provided to force the housing against a bass portion of the first conduit so that the seals and the pressure sensitive element are compressed therebetween.

U.S. Pat. No. 5,351,550, which issued to Maurer on Oct. 4, 1994, describes a pressure sensor that is adapted for use with a component carrier. The pressure sensor is provided with a housing member that attaches to a rigid and generally planar member, such as a ceramic circuit board. The legs of the housing member can pass through holes in the circuit board or, alternatively, can attach to edges thereof. The legs of the housing are provided with bails which have steps shaped to cease the circuit board after the legs are flexed to permit insertion of the board between then. The housing is provided with an opening that is shaped to receive a media seal, a pressure sensor die and a conductive seal between a surface of the opening and a surface of the ceramic circuit board. When the circuit board is attached to the housing, the seals and the pressure sensor die are compressed therebetween to provide good fluid sealing association between the components and to also provide electrical communication between components on the pressure sensor die and components on the circuit board. An alternative embodiment of the sensor comprises two housing members that are attached to opposite sides of the same circuit board so that a differential pressure can be measured.

The United States Patents described directly above are hereby explicitly incorporated by reference. Each of these patents discusses certain aspects of pressure sensor designs. For example, they describe the use of pressure sensor dies which are made of silicon and, in some applications, etched to provide a thin diaphragm portion in one surface of the die. In addition, these patents illustrate and describe the manner in which a pressure sensor die can be disposed between a media seal and an elastomeric conductive seal for the purpose of isolating a region of the die and disposing it in fluid communication with a fluid whose pressure is to be measured. The concepts relating to the structure and manufacture of the pressure sensor die and the use of media seals and conductive elastomeric seals are fully and completely described in the patents cited above and are very well known to those skilled in the art. For these reasons, these concepts relating to the structure and manufacture of the seals and pressure sensor die will not be described in additional detail below.

In certain applications of pressure sensors, the sensor is intended to measure a relatively small differential pressure that may exist between two volumes of fluid which are each at much higher pressures. For example, a pressure sensor die may be used in an application where it is necessary to measure a differential pressure of 0 PSI to 5 PSI between two volumes of fluid that are each at a pressure of approximately 250 PSI. For example, one fluid might be at a pressure of 248 PSI while the other fluid is at a pressure of 250 PSI. The pressure sensor would then measure the difference (i.e. 2 PSI) and provide an output signal representing that differential pressure. Known types of differential pressure sensors can be susceptible to distortions caused by the significant difference between the absolute pressures of the two measured volumes and ambient pressure surrounding the sensor. In other words, in the example described above, certain internal components of the pressure sensor will experience a pressure differential of 250 PSI between one of the measured volumes and ambient pressure.

In many pressure sensors, piezoresistive components are used. These components are highly responsive to changes in the stress imposed on the element. As a result, it is very important that the piezoresistive components be protected from stresses that are not directly related to the pressures being measured. It would therefore be highly beneficial if a differential pressure sensor could be developed that eliminates or significantly reduces the disadvantageous stresses that can otherwise occur because of the high pressure differentials between the pressure of the measured volumes and ambient pressure.

SUMMARY OF THE INVENTION

The present invention provides a pressure sensor that comprises a housing structure having a cavity formed therein. A pressure sensitive component is disposed between a first seal and a second seal. The pressure sensitive component has a first surface and a second surface. The first seal is disposed on the first surface of the pressure sensitive component and the second seal is disposed on the second surface of the pressure sensitive component. This places the pressure sensitive component between the first and second seals where it is compressed between the seals. The first and second seals and the pressure sensitive component are disposed within the cavity of the housing structure.

The present invention further comprises a first conduit that is disposed in fluid communication with the first surface of the pressure sensitive component and a second conduit disposed in fluid communication with the second surface of the pressure sensitive component. A bypass conduit is provided which connects the first conduit in fluid communication with the cavity in order to equalize the pressure of the first conduit with a portion of the cavity surrounding the first and second seals. Although the preferred embodiment will be described below in terms of the equalization of pressures at the radially inward and radially outward surfaces of the first and second seals, it should be understood that alternative structures, with differing geometries, could be used to equalize pressures on internal and external surfaces other than the radial surfaces.

The housing structure, in a particularly preferred embodiment of the present invention, comprises a first housing portion and a second housing portion which are attached together in order to enclose the cavity. The first conduit can be formed as part of the first housing portion and the second conduit can be formed as part of the second housing portion. A plurality of electrical conductors are encapsulated within the housing structure, wherein each of the plurality of electrical conductors is connected in electrical communication with the pressure sensitive component and extends through the housing structure to a position external to the housing structure. This allows the pressure sensor to be connected electrically to external devices. The second seal can be electrically conductive through its thickness in order to provide electrical communication between selected ones of the plurality of electrical conductors and preselected locations on the second surface of the pressure sensitive component. The pressure sensitive component can comprise a silicon die with at least one piezoresistive component disposed on the second surface. In addition, the first surface can be etched in order to form a diaphragm region of the second surface. It should be understood that many of the characteristics described immediately above are optional in certain embodiments of the present invention and not required in all of its forms.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Throughout the Description of the Preferred Embodiment, like components will be identified by like reference numerals.

Figure 1:
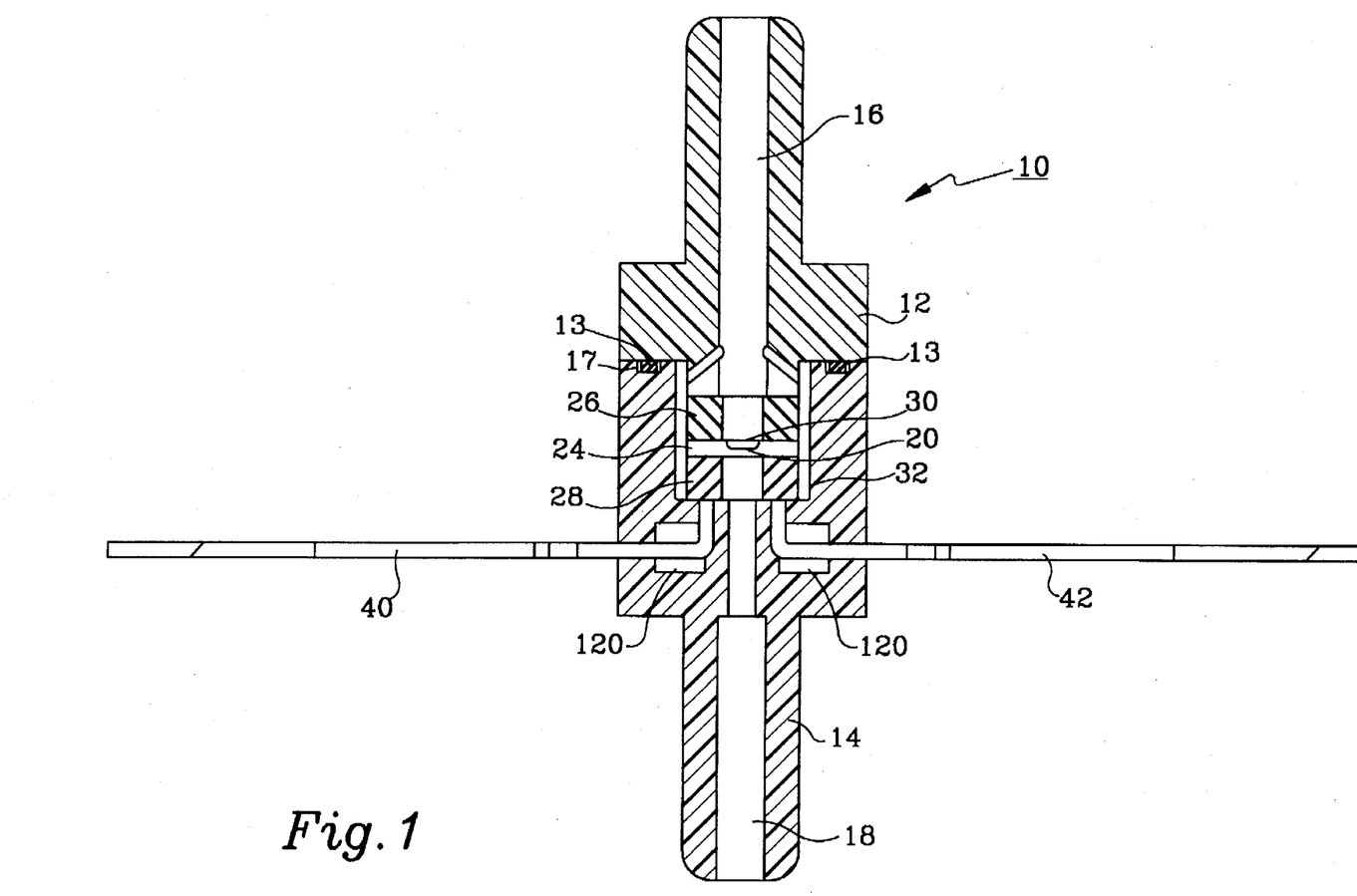
FIG. 1 is a section view of a pressure sensor made in accordance with the present invention.

In FIG. 1, a pressure sensor is illustrated in which the present invention is incorporated. A housing structure is designated by reference numeral 10. The housing structure can comprise a first portion 12 and second portion 14. The first portion 12 of the housing structure is provided with a first conduit 16 and the second portion 14 of the housing structure is provided with a second conduit 18. The housing structure 10 is provided with a cavity 20 in which the pressure sensing structure can be disposed. The pressure sensing structure comprises a pressure sensitive component 24 which is disposed between a first seal 26 and a second seal 28.

The pressure sensitive component 24 has a first surface 30 and a second surface 32. The first surface 30 is disposed in fluid communication with the first conduit 16 and the second surface 32 is disposed in fluid communication with the second conduit 18.

For the purpose of clearly describing the present invention, the cavity 20 is shown in FIG. 1 as being sufficiently larger than the outside dimensions of the first and second seals and the pressure sensitive component 24 to provide a gap between the pressure sensitive structure and the walls of the cavity 20. It should be understood that in most applications of the present invention, no actual visible gap exists in this region, but sufficient space exists to allow pressure equalization to occur as will be described in greater detail below.

In FIG. 1, two electrical conductors, 40 and 42, are illustrated. The conductors are encapsulated within the housing structure 10 and provide electrical communication between the second surface 32 of the pressure sensitive component 24 and external devices. The electrical conductors extend through the housing structure 10 to a position external to the housing structure so that equipment can be connected in electrical communication with the pressure sensor. As can be seen in FIG. 1, the inwardly directed ends of the leads, 40 and 42, are bent upward. These ends of the leads are exposed at the bottom surface of the cavity 20. The second seal 28 is placed over the region where the distal ends of the leads are exposed in order to provide a seal between the bottom surface of the cavity 20 and the second seal 28. If an appropriate seal is not provided in this region, it could be possible for high pressure liquid to migrate through the housing 10 along the interface between the two electrical conductors, 40 and 42, and the plastic encapsulant that surrounds them. In other words, without a proper seal, the liquid would migrate downward from the bottom surface of cavity 20 between the surfaces of the electrical conductors and the plastic material of the housing structure 10. Even though interment contact exists between the outer surface of the electrical conductors and the encapsulating plastic, high pressures are capable of forcing a migration of the fluid along this material interface until it eventually escapes at the region where the electrical conductors extend outward from the outer surface of the housing structure 10. By placing the second seal 28 directly over the region of the lower surface of the cavity 20 where the distal ends of the electrical conductors are exposed, this type of leakage path is inhibited. It should be understood that in certain embodiments of the present invention, this electrical communication between the conductors and the pressure sensitive component is accomplished by disposing the ends of the conductors in contact with the second seal 28 which is electrically conductive. This is facilitated if the second seal is a conductive elastomeric seal as described in U.S. Pat. Nos. 5,184,107 and 5,410,916.

Figure 2:
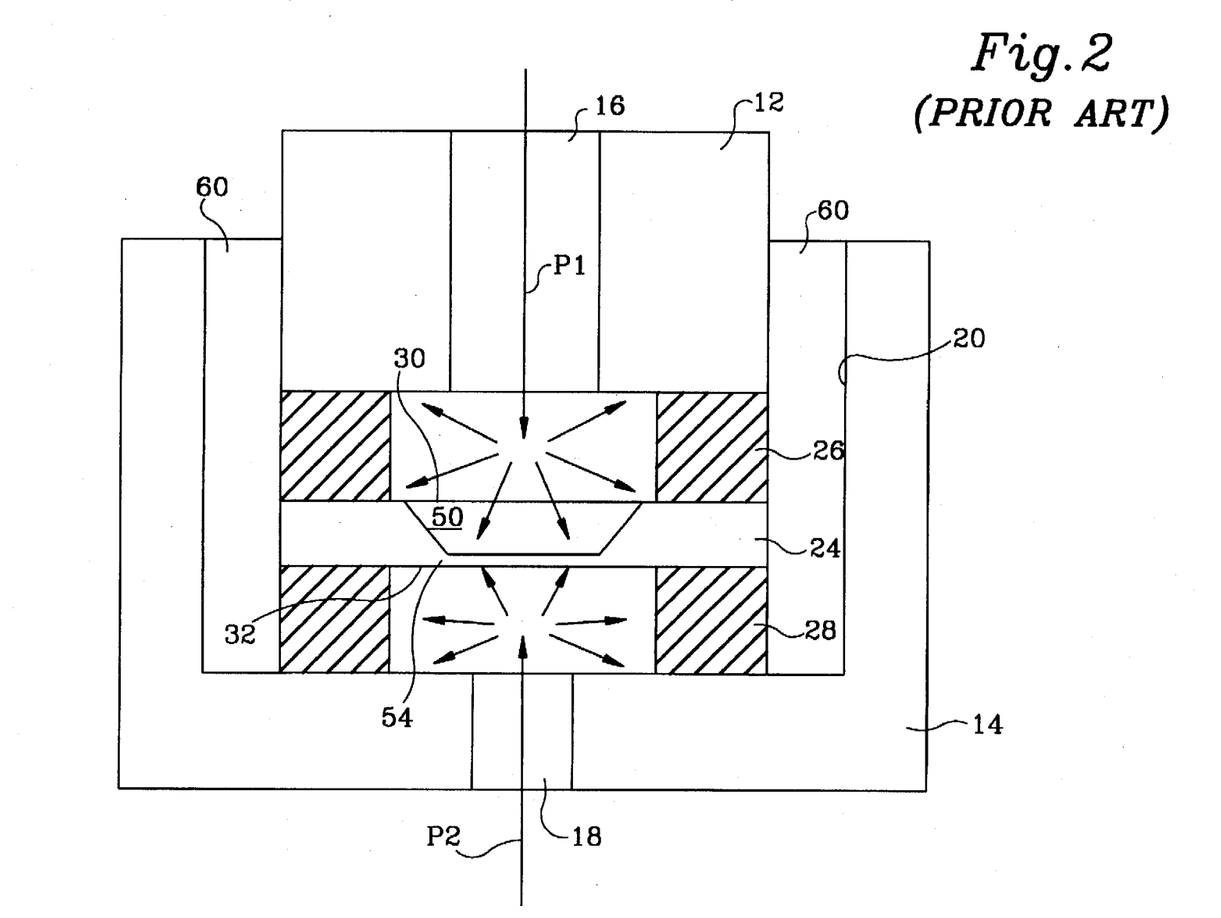
FIG. 2 is a section view of a portion of FIG. 1 showing the pressure within the pressure sensitive structure.

FIG. 2 is a highly simplified representation of the sectional view shown in FIG. 1. FIG. 2 illustrates the pressure sensitive component 24 that is compressed between the first seal 26 and the second seal 28. In FIG. 2, the pressure sensitive component 24 has a depression 50 formed in the first surface 30. This depression 50 can be formed by etching the first surface 30 of a silicon die and results in the formation of a thin diaphragm portion 54 of the second surface 32. Although not shown in FIG. 2, those skilled in the art are aware that piezoresistors are typically deposited on the second surface in the diaphragm region. In certain embodiments of the present invention, the pressure sensor can alternatively use a silicon die that is not etched to form the depression 50 and the diaphragm 54. These types of pressure sensors use a die that is referred to by those skilled in the art as a "slab die". If a first pressure is provided in the first conduit 16 and a second pressure is provided in the second conduit 18, the diaphragm 54 and its piezoresistors will be stressed according to the differential pressure between the first pressure P1 and the second pressure P2. In many high pressure applications, the first and second pressures can be large relative to the expected differential pressure between the first and second conduits. As an example, the first and second pressures can be approximately 250 PSI or greater while the differential pressure intended to be measured by the pressure sensitive component 24 will be in the range of zero to 10 PSI. These magnitudes are merely offered as being representative of the types of difference between the actual absolute pressures in the first and second conduits and the expected differential pressure across the diaphragm 54 and not intended to represent any limitation to the applications of the present invention.

In FIG. 2, the first and second seals, 26 and 28, and the pressure sensitive component 24 are illustrated as being smaller in outside dimension than the inside dimension of the cavity 20. This is represented by the space identified by reference numeral 60. As discussed above, the visible space 60 does not actually exist in most embodiments of the present invention. Instead, the first and second seals and the pressure sensitive component are only slightly smaller than the cavity itself and the space 60 is not actually visible in most applications. However, space 60 is illustrated in the Figures to represent the fact that no actual pressure seal exists between the outer surfaces of the first and second seals and the inner surface of the cavity 20. Although the force of the first housing portion 12 and the second housing portion 14 compresses the pressure sensitive structure by compressing the pressure sensitive component 24 between the first and second seals, 26 and 28, these forces are axial and do not provide any significant sealing between the seals and the cavity walls in the horizontal direction of the illustration in FIG. 2.

One of the significant problems concerning differential pressure sensors is illustrated in FIG. 2. The pressures on the first and second surfaces, 30 and 32, of the pressure sensitive component 24 also exert outward forces against the inner surfaces of the first and second seals. Even if the first pressure P1 is equal to the second pressure P2 and no differential pressure exists, the first and second seals will experience the full extent of the difference between the first and second pressures and ambient pressure that exists in space 60 around the pressure sensitive structure within cavity 20. This result is represented by the plurality of arrows directly above and below the first and second surfaces of the pressure sensitive component 24. If the first and second seals are distorted radially or outwardly, this stress will be readily transferred to the pressure sensitive component 24 and distortion of the piezoresistors on the second surface 32 can occur. This distortion can result in a significantly deleterious offset in the output signal from the pressure sensor. In addition, the offset is not constant and independent of the absolute common pressure and, as a result, calibration of the differential pressure sensor can be less accurate and more difficult because of its dependence on the pressure differences between $P_1$ and $P_2$ to ambient pressure.

Figure 3:
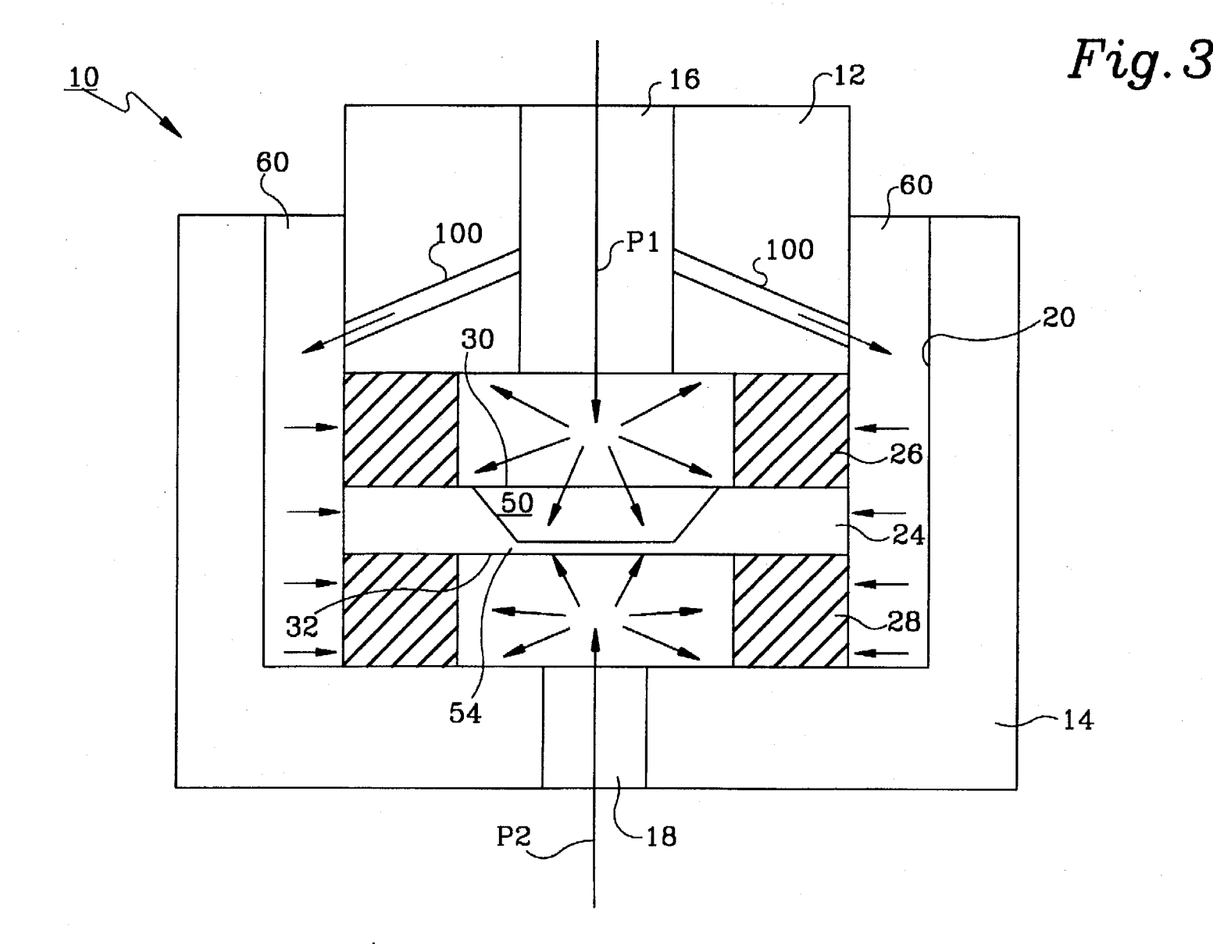
FIG. 3 shows a similar view to that of FIG. 2 but with the bypass conduit of the present invention provided.

FIG. 3 illustrates the improvement provided by the present invention. One or more bypass conduits 100 are provided in the housing structure 10 which connect the first conduit 16 in fluid communication with the cavity 20. As a result, the pressure in space 60, surrounding the pressure sensitive structure within the cavity 20, is equalized to the pressure in the first conduit 16. It should be understood that an alternative application of the present invention could connect the space 60 in fluid communication with the second conduit 18 instead of the first conduit 16. Since the differential pressure sensor is anticipated to have generally similar pressures in the first and second conduits, differing only by the measured differential pressure, either embodiment will improve the operation of the differential pressure sensor. The arrangement illustrated in FIG. 3 is specifically configured to equalize the pressure P1 in the first conduit 16 with the pressure that is radially outward from the first and second seals, 26 and 28. This particular embodiment of the present invention focuses on equalizing the radial forces on the seals and the pressure sensitive component 24. However, it should be understood that the basic concept of the present invention could be easily adapted to equalize the forces caused by pressures on other surfaces instead of or in addition to the radial surfaces. The concept of the present invention relates to the equalization of pressures on internal surfaces and external surfaces of the pressure sensitive structure which comprises the first and second seals and the pressure sensitive component 24.

In FIG. 3, the bypass conduit 100 allows the pressure in space 60 to equalize with the pressure within the first conduit 16. This equalization provides a pressure in space 60 that is exerted radially inwardly against the outer surfaces of the first and second seals and the pressure sensitive component 24. These inwardly directed forces, represented by the arrows within space 60 in FIG. 3, provide a force that balances the outwardly directed force caused by the pressure P1 in the first conduit 16 and, as a result, the balanced forces reduce the resulting stress on the pressure sensitive structure and specifically on the piezoresistors on the second surface 32 of the pressure sensitive component 24. Naturally, if the first and second pressures, P1 and P2, are significantly different from each other the beneficial result of the present invention will be reduced because the resulting pressure in the space 60 will not be as similar to the second pressure P2 as it would be if the first and second pressures were very close in magnitude to each other. However, even in situations where the first and second pressures are significantly different from each other and the measured differential pressure is therefore relatively large, the bypass conduit 100 of the present invention will improve the circumstances by some measurable degree as long as the second pressure P2 is greater than ambient pressure.

Figure 4:
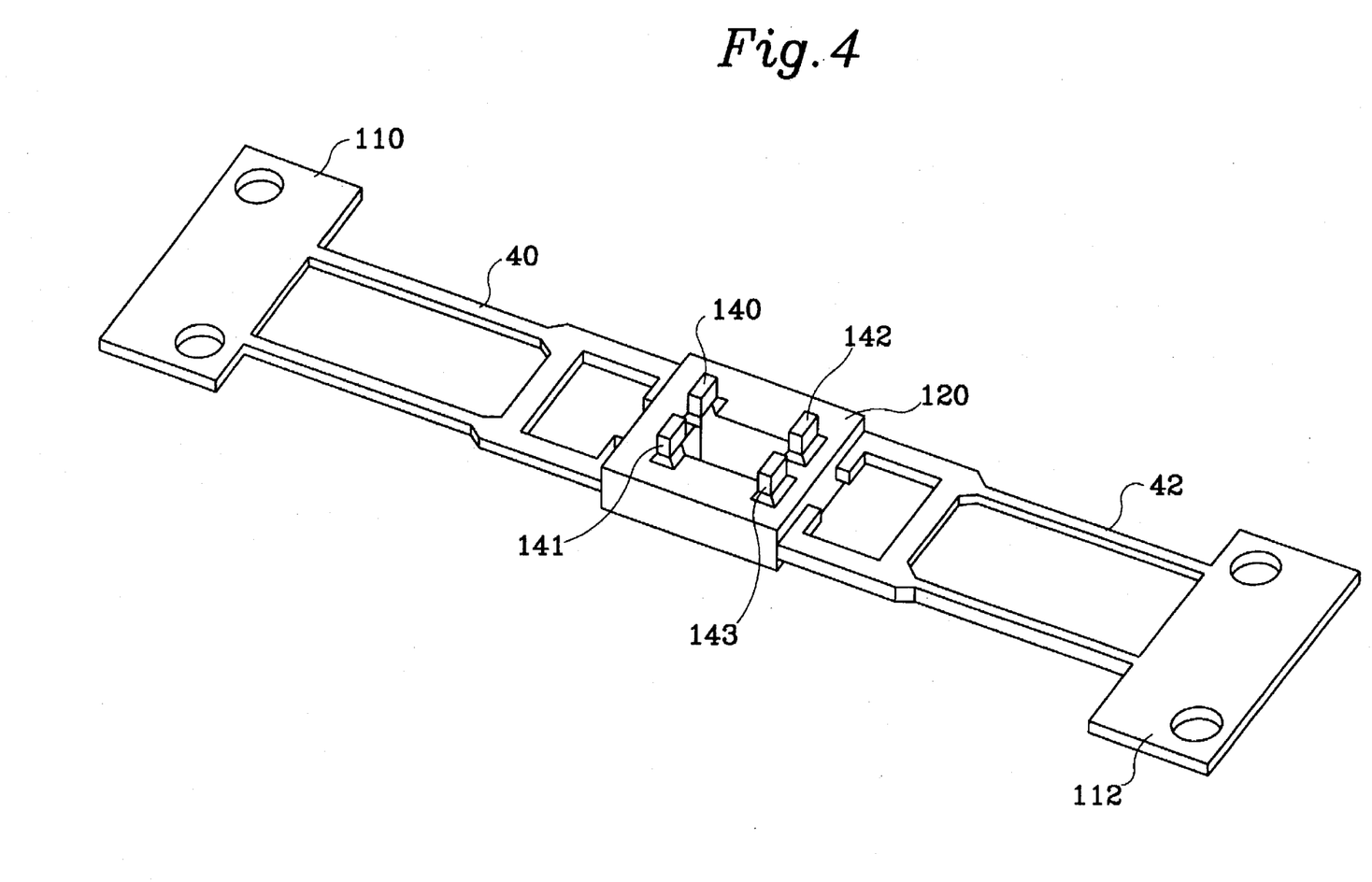
FIGS. 4 and 5 show intermediate manufacturing stages of a pressure sensor incorporating the present invention.

FIG. 4 illustrates an intermediate stage of manufacture of a pressure sensor made in accordance with the present invention. Two conductive lead assemblies, are provided. Each of the lead assemblies can be part of a long strip of conductive material that is sequentially punched and formed to provide a plurality of lead pairs as shown in FIG. 4. The specific method of manufacturing the lead assemblies is not limiting to the present invention. The two lead assemblies are associated together and molded into a preliminary encapsulation 120. As can be seen in FIG. 4, each of the lead assemblies was initially bent to cause the distal ends of their respective leads to point upward in the illustration. These distal ends, 140–143, are used to provide electrical contact with the pressure sensitive component 24 when they are pressed against selected portions of the second seal 28. The preliminary encapsulation 120 maintains the accurate positions of the distal ends, 140–143, during assembly of the lead assemblies in a mold prior to a later plastic encapsulation procedure. A portion of the preliminary encapsulation 120 is also illustrated in section view in FIG. 1. It should be understood that this preliminary encapsulation procedure is intended primarily to hold the lead frame segments in their proper location during the subsequent encapsulation process. It is not a requirement in all embodiments of the present invention and does not directly relate to the primary concept of the present invention except for the fact that it facilitates the manufacture of the pressure sensor in which the present invention is incorporated in the description above. The number and shape of the electrical conductors are also not limited to those described and illustrated herein.

Figure 5:
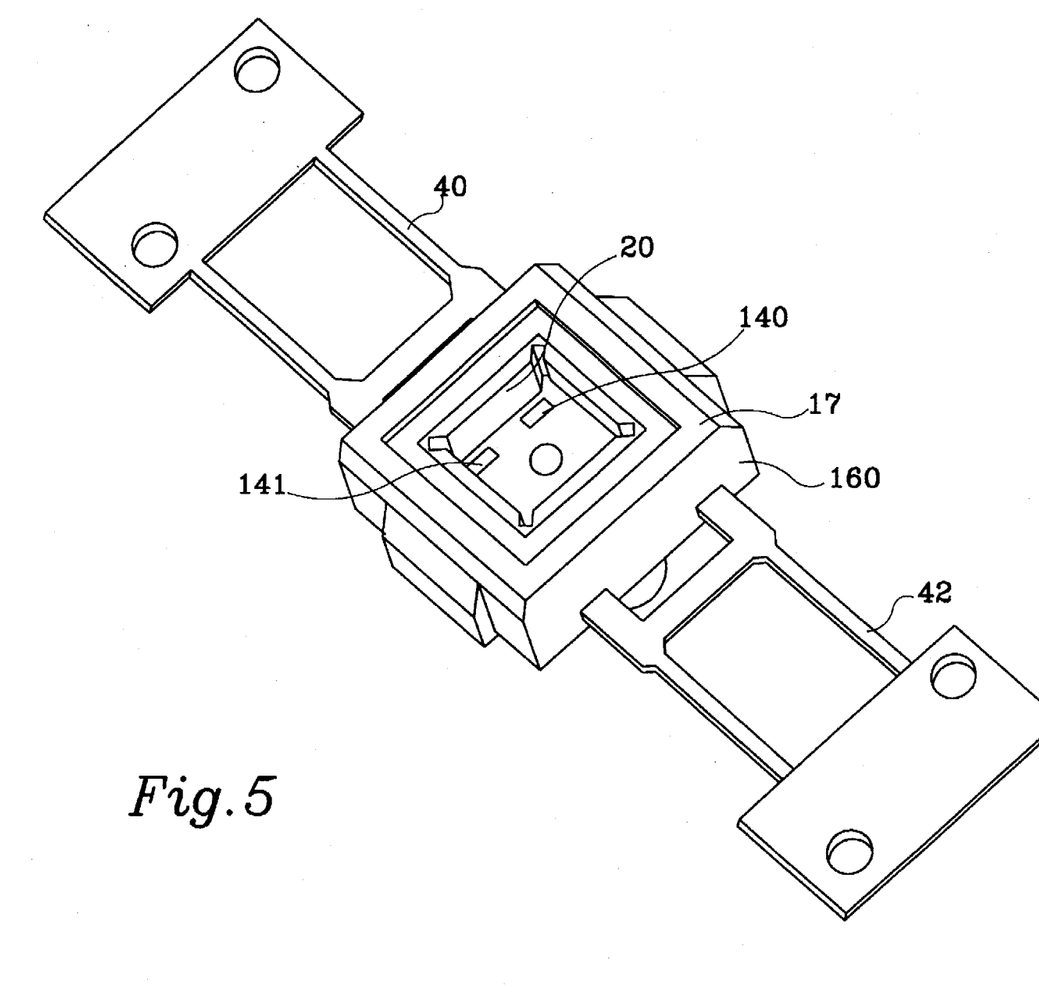

FIG. 5 illustrates the second portion of the pressure sensor following a second overmolding procedure that forms the encapsulation identified by reference numeral 160. It should be understood that the encapsulation 160 serves as the second housing portion 14 which is described above in conjunction with FIG. 1. In the view of FIG. 5, the cavity 20 is shown with the exposed distal ends, 140 and 141, of the leads at the bottom surface of the cavity 20. If a conductive elastomeric seal is disposed in the cavity 20, it will move into partial electrical communication with the distal ends of the conductive leads as illustrated in the section view of FIG. 1. In FIG. 5, it can be seen how the second seal 28 will cover the exposed distal ends of the conductive leads as described above in conjunction with FIG. 1. When the second seal 28 is disposed on the bottom surface of the cavity 20, it covers the exposed distal ends of the electrical conductors. Then, as will be described in conjunction with FIG. 6, when the first portion 12 of the housing structure is snapped onto the second portion 14, the downward force exerted between these two housing portions compressed the first seal 26, the pressure sensitive component 24, and the second seal 28 together. This compressive force pushes the second seal 28 downward against the bottom of the cavity 20 and provides a seal between the second seal and the bottom surface of the cavity which prevents the distal ends of the electrical conductors from being exposed to a high pressure that could otherwise cause the migration of fluid along the electrical conductors as described above in conjunction with FIG. 1.

Figures 6, 7:
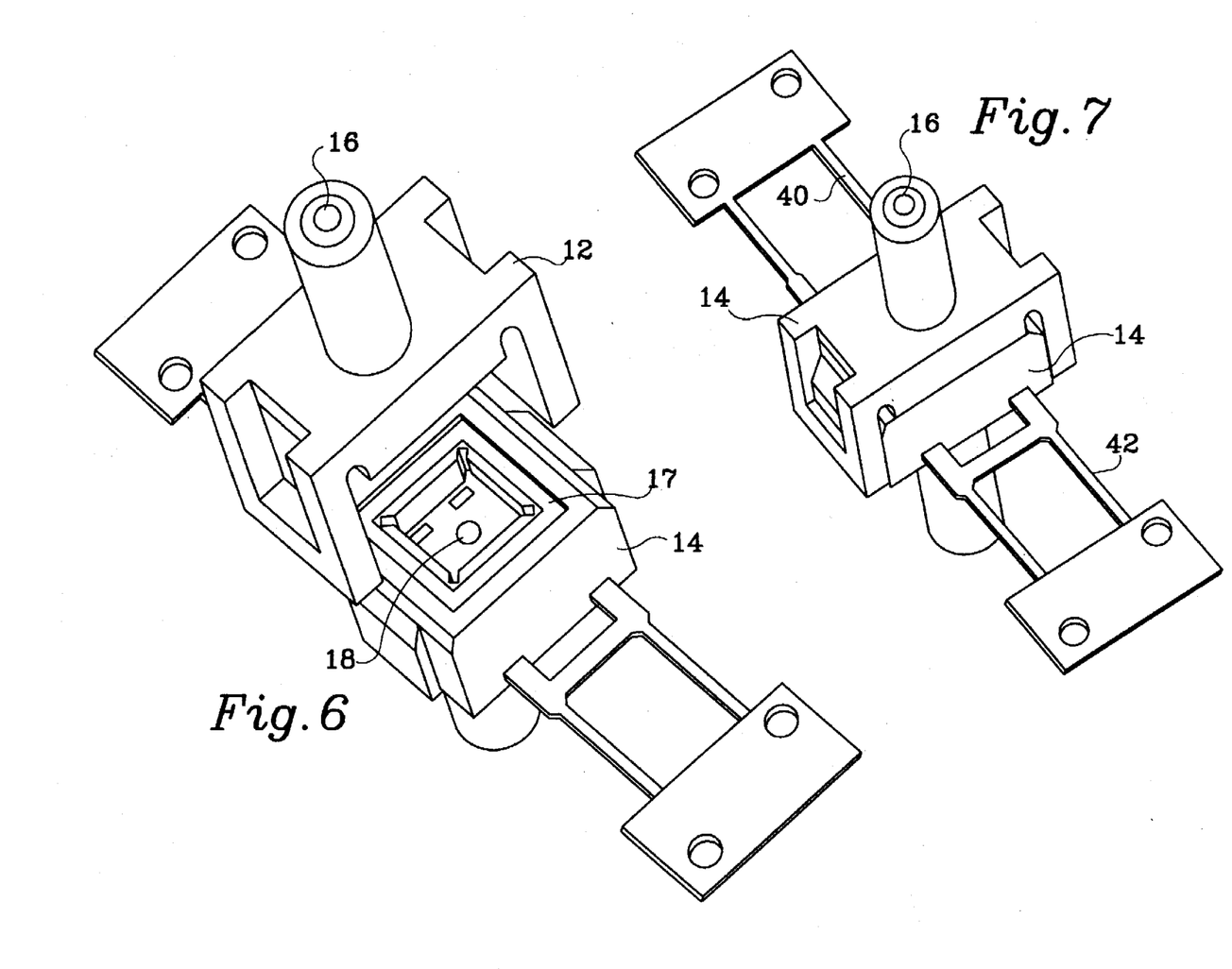
FIGS. 6 and 7 show later stages of manufacture of a pressure sensor.

FIG. 6 is an exploded view showing the first housing portion 12 with its first conduit 16 and the second housing portion 14 with its second conduit 18 that is visible within the cavity 20. The first and second housing portion are shaped to snap together in a manner that is generally known to those skilled in the art and described in detail in U.S. Pat. No. 5,184,107 and U.S. Pat. No. 5,410,916.

FIG. 7 illustrates the pressure sensor after the first and second housing portions are snapped together. It should be clearly understood that, prior to attaching the first housing portion 12 to the second housing portion 14 as shown in FIG. 7, the first and second seals, 26 and 28, and the pressure sensitive component 24 shown in FIG. 1 are disposed in the cavity 20 of the housing structure 10. In FIG. 1 of U.S. Pat. No. 5,184,107 and FIG. 2 of U.S. Pat. No. 5,410,916, this assembly of the seals and pressure sensitive component within a cavity are illustrated and described in specific detail. The seal 13 shown in FIG. 1 is disposed in groove 17 shown in FIGS. 1, 5 and 6 to prevent the pressure in the space 60 from escaping to the atmosphere.

Figure 8:
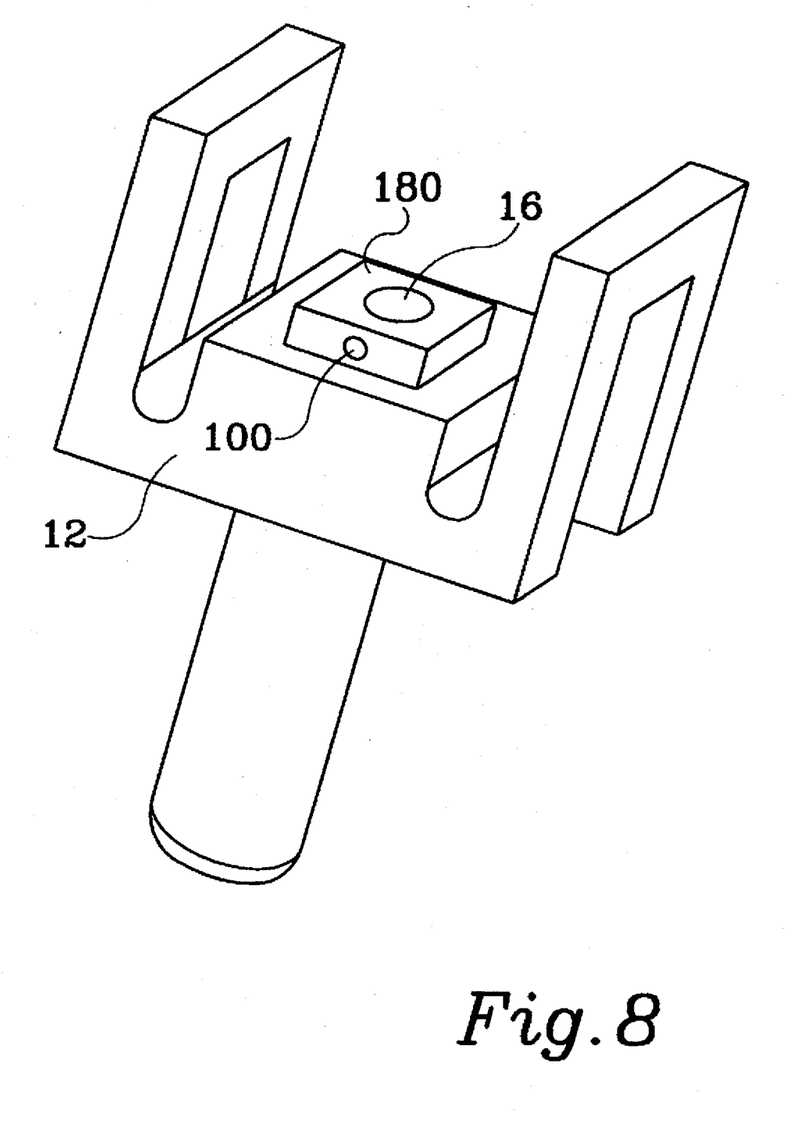
FIG. 8 shows a portion of the housing structure with the bypass conduit of the present invention incorporated therein.

FIG. 8 is a perspective view of the first housing portion 12 to show the portion of the first housing portion that is partially disposed in the cavity 20 of the second housing portion 14 in order to provide the compressive force that compresses the first and second seals and the pressure sensitive component together as described above. One of the bypass conduits 100 is illustrated at the location where it intersects with the generally square boss 180. Although not visible in FIG. 8, it should be understood that another bypass conduit 100 could intersect the boss at its opposite side. The first portion 12 is therefore used to provide the bypass conduit which connects the first conduit 16 in fluid communication with the cavity 20 for the purposes and advantages described above.

The present invention has been described with particular emphasis on the bypass conduit connecting the first conduit with the cavity 20 and, more particularly, with the space 60 in the cavity 20 surrounding the seals and the of the first and second seals and the pressure sensitive component. As discussed above, it is equally advantageous to alternatively provide a bypass conduit that connects the second conduit 18 with the region surrounding the pressure sensitive structure within the cavity in alternative embodiments of the present invention. The particular selection of location for the bypass conduit 100, in the embodiment shown in the Figures and described above, is advantageous in this particular structure because it avoids the conductive leads that are encapsulated within the second housing structure 14. In alternative pressure sensors, this avoidance of the conductive leads in the second housing structure 14 might not be necessary.

As described above, the present invention provides a pressure equalization between the outer surfaces of the pressure sensitive structure and the higher pressure contained within the first conduit. Either the first or second pressures, which are within the first and second conduits, can be used for these purposes because they are each typically higher than ambient pressure and also generally similar to each other.

Although the present invention has been described with particular specificity to illustrate a preferred embodiment, it should be understood that alternative embodiments are within its scope. The concept of providing pressure equalization between the cavity portion of the housing structure and one of the two conduits provides the essence of the present invention which is to balance the forces externally and internally to the first and second seals and the pressure sensitive component in order to minimize the stress on the pressure sensitive component and its piezoresistors.

The embodiments of the invention in which an exclusive property or right is claimed are defined as follows:

1. A pressure sensor, comprising:

a housing structure having a cavity formed therein;

a pressure sensitive component having a first surface and a second surface;

a first seal disposed on said first surface of said pressure sensitive component;

a second seal disposed on said second surface of said pressure sensitive component, said pressure sensitive component being compressed between said first and second seals, said first and second seals and said pressure sensitive component being disposed within said cavity;

a first conduit disposed in fluid communication with said first surface of said pressure sensitive component;

a second conduit disposed in fluid communication with said second surface of said pressure sensitive component; and a bypass conduit connecting said first conduit in fluid communication with said cavity to equalize the pressure of said first conduit with a portion of said cavity surrounding said first and second seals.

2. The pressure sensor of claim 1, wherein:

said housing structure comprises a first housing portion and a second housing portion, said first and second housing portions being attached together to enclose said cavity.

3. The pressure sensor of claim 2, wherein:

said first conduit is formed as part of said first housing portion and said second conduit is formed as part of said second housing portion.

4. The pressure sensor of claim 1, further comprising:

a plurality of electrical conductors encapsulated within said housing structure, each of said plurality of electrical conductors being connected in electrical communication with said pressure sensitive component and extending through said housing structure to a position external to said housing structure.

5. The pressure sensor of claim 1, wherein:

said second seal is electrically conductive through its thickness to provide electrical communication between selected ones of said plurality of electrical conductors and preselected locations on said second surface of said pressure sensitive component.

6. The pressure sensor of claim 1, wherein:

said pressure sensitive component comprises a silicon die with at least one piezoresistive component disposed on said second surface.

7. The pressure sensor of claim 6, wherein:

said first surface is etched to form a diaphragm region of said second surface.

8. A pressure sensor, comprising:

a housing structure having a cavity formed therein, said housing structure comprising a first housing portion and a second housing portion, said first and second housing portions being attached together to enclose said cavity;

a pressure sensitive component having a first surface and a second surface;

a first seal disposed on said first surface of said pressure sensitive component;

a second seal disposed on said second surface of said pressure sensitive component, said pressure sensitive component being compressed between said first and second seals, said first and second seals and said pressure sensitive component being disposed within said cavity;

a first conduit disposed in fluid communication with said first surface of said pressure sensitive component;

a second conduit disposed in fluid communication with said second surface of said pressure sensitive component;

a bypass conduit connecting said first conduit in fluid communication with said cavity to equalize the pressure of said first conduit with a portion of said cavity surrounding said first and second seals; and a plurality of electrical conductors encapsulated within said housing structure, each of said plurality of electrical conductors being connected in electrical communication with said pressure sensitive component and extending through said housing structure to a position external to said housing structure.

9. The pressure sensor of claim 8, wherein:

said first conduit is formed as part of said first housing portion and said second conduit is formed as part of said second housing portion.

10. The pressure sensor of claim 8 wherein:

said second seal is electrically conductive through its thickness to provide electrical communication between selected ones of said plurality of electrical conductors and preselected locations on said second surface of said pressure sensitive component.

11. The pressure sensor of claim 8, wherein:

said pressure sensitive component comprises a silicon die with at least one piezoresistive component disposed on said second surface.

12. The pressure sensor of claim 11, wherein:

said first surface is etched to form a diaphragm region of said second surface.

13. A pressure sensor, comprising:

a housing structure having a cavity formed therein, said housing structure comprising a first housing portion and a second housing portion, said first and second housing portions being attached together to enclose said cavity;

a pressure sensitive component having a first surface and a second surface;

a first seal disposed on said first surface of said pressure sensitive component;

a second seal disposed on said second surface of said pressure sensitive component, said pressure sensitive component being compressed between said first and second seals, said first and second seals and said pressure sensitive component being disposed within said cavity;

a first conduit disposed in fluid communication with said first surface of said pressure sensitive component;

a second conduit disposed in fluid communication with said second surface of said pressure sensitive component, said first conduit being formed as part of said first housing portion and said second conduit being formed as part of said second housing portion;

a bypass conduit connecting said first conduit in fluid communication with said cavity to equalize the pressure of said first conduit with a portion of said cavity surrounding said first and second seals; and a plurality of electrical conductors encapsulated within said housing structure, each of said plurality of electrical conductors being connected in electrical communication with said pressure sensitive component and extending through said housing structure to a position external to said housing structure.

14. The pressure sensor of claim 13 wherein:

said second seal is electrically conductive through its thickness to provide electrical communication between selected ones of said plurality of electrical conductors and preselected locations on said second surface of said pressure sensitive component.

15. The pressure sensor of claim 13, wherein:

said pressure sensitive component comprises a silicon die with at least one piezoresistive component disposed on said second surface.

16. The pressure sensor of claim 15, wherein:

said first surface is etched to form a diaphragm region of said second surface.

* * * * *